United States Patent [19]

Smith

[11] Patent Number: 4,767,032

[45] Date of Patent: Aug. 30, 1988

[54] PASTE DISPENSER

[75] Inventor: Eugene W. Smith, Kalamazoo, Mich.

[73] Assignee: L. Perrigo Company, Allegan, Mich.

[21] Appl. No.: 902,603

[22] Filed: Sep. 2, 1986

[51] Int. Cl.$^4$ .............................................. G01F 11/00
[52] U.S. Cl. .................................. 222/319; 222/340; 222/386; 222/401; 222/505; 222/509
[58] Field of Search ............... 222/391, 386, 401, 340, 222/336, 319, 509, 505

[56] References Cited

U.S. PATENT DOCUMENTS

| | | | |
|---|---|---|---|
| 1,270,835 | 7/1918 | Jersemann | 222/391 |
| 2,269,371 | 1/1942 | Hammerschmidt et al. | 222/391 X |
| 2,732,101 | 1/1956 | Sohn | 222/391 X |
| 3,255,935 | 6/1966 | Spatz | 222/391 X |
| 4,413,759 | 11/1983 | Mettenbrink | 222/213 |
| 4,421,255 | 12/1983 | Czech | 222/387 |
| 4,437,584 | 3/1984 | Connors et al. | 222/137 |
| 4,437,591 | 3/1984 | von Schuckmann | 222/391 |
| 4,461,403 | 7/1984 | Prahs | 222/391 X |
| 4,479,592 | 10/1984 | Rusing et al. | 222/319 |
| 4,487,341 | 12/1984 | Daykin et al. | 222/391 |
| 4,506,810 | 3/1985 | Goncalves | 222/391 |
| 4,511,068 | 4/1985 | Bossina | 222/340 X |
| 4,522,317 | 6/1985 | Goncalves | 222/391 |

FOREIGN PATENT DOCUMENTS

| | | | |
|---|---|---|---|
| 3006680 | 8/1981 | Fed. Rep. of Germany | 222/386 |
| 3104726 | 8/1982 | Fed. Rep. of Germany | 222/386 |
| 2512787 | 3/1983 | France | 222/386 |
| 696310 | 8/1953 | United Kingdom | 222/391 |

Primary Examiner—Joseph J. Rolla
Assistant Examiner—David H. Bollinger
Attorney, Agent, or Firm—Price, Heneveld, Cooper, DeWitt, & Litton

[57] ABSTRACT

A dispenser includes a hollow dispensing tube which reciprocates within a container and which incrementally moves a piston downwardly for forcing paste upwardly through a lower inlet end of the tube and outwardly through a nozzle located at the opposite end of the tube. To facilitate the operation of the dispensing tube, an actuator is employed which is pivotally mounted at one end to a head mounted to the body of the dispenser with the pivot connection located on one side of and adjacent to the dispensing tube. A cam and cam follower extend between the actuator and the dispensing tube for initially providing an increased downwardly applied force to the dispensing tube and subsequently decreasing the force during a dispensing stroke of the actuating lever.

13 Claims, 5 Drawing Sheets

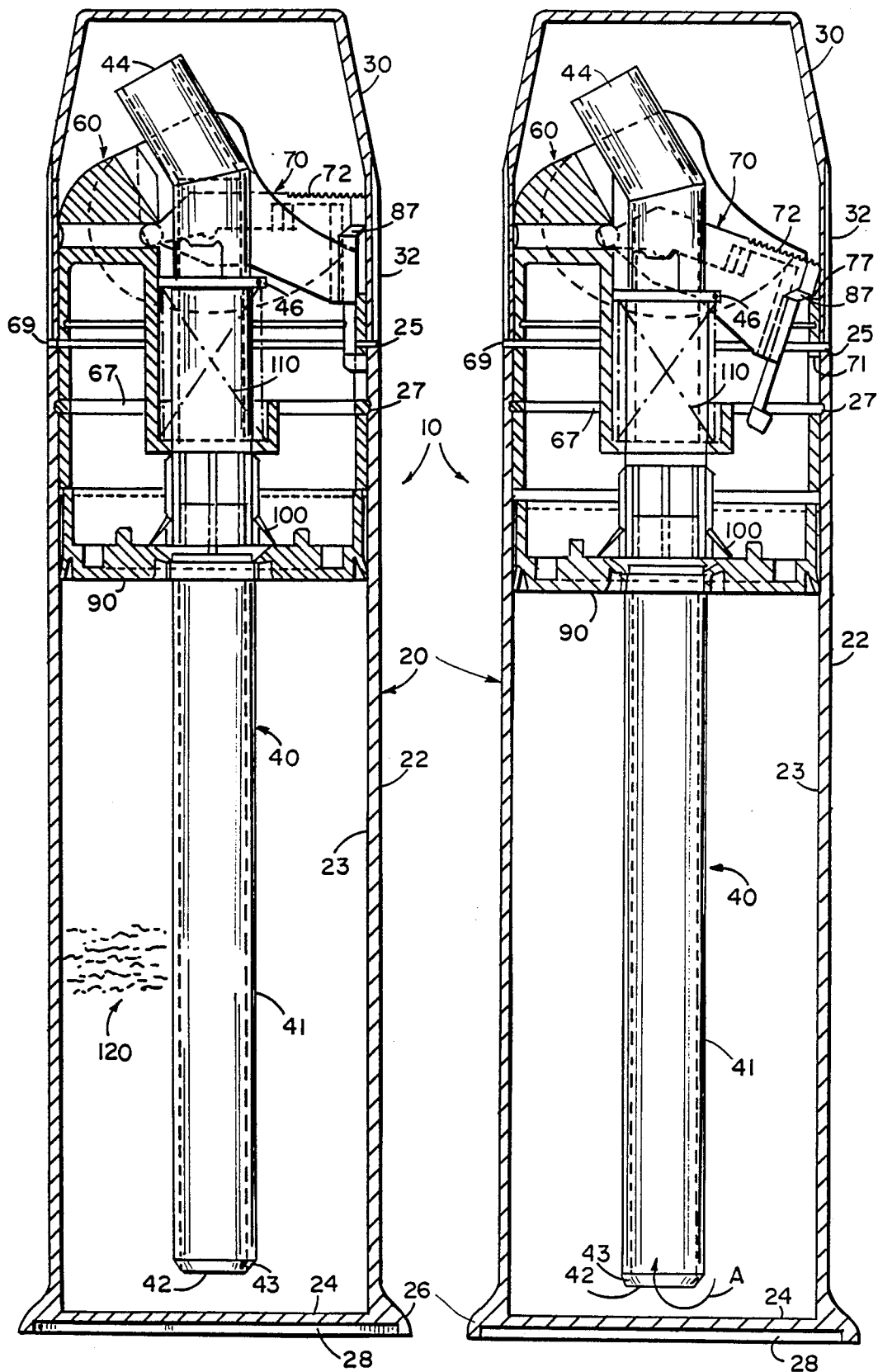

PASTE DISPENSER

BACKGROUND OF THE INVENTION

The present invention relates to paste dispensers and particularly a pump-type dispenser for toothpaste.

There exists a variety of toothpaste dispensing pumps utilizing different operating principals. Once such pump is generally known as a vacuum pump and employs a pair of check valves which operate sequentially to develop a partial vacuum in the space above the paste for drawing the paste upwardly and outwardly through a dispensing nozzle. Another system employs a piston which initially is located at the bottom of a dispensing container and is ratcheted upwardly by a reciprocating plunger to force paste from a nozzle at the top of the dispenser. Other approaches include aerosol-type pressurized dispenser and finally a dispenser in which a hollow dispensing tube with a nozzle at one end is employed and reciprocated through a ratchet mechanism and a piston which moves downwardly to force paste through an open lower end upwardly through the nozzle. U.S. Pat. Nos. 2,732,101 and 4,437,584 are representative of the latter type of dispensers. It has been discovered with the downwardly moving piston forcing paste through the relatively small diameter tube, a significant amount of pressure is required on the actuating lever used for reciprocating the tube in order to force the viscous paste upwardly and through the dispensing nozzle. Thus, with these types of pumps, typically the dispensing operation can be somewhat difficult and the parts prone to failure.

SUMMARY OF THE PRESENT INVENTION

The system of the present invention incorporates a hollow dispensing tube which reciprocates and which incrementally moves a piston downwardly for forcing paste upwardly through a lower inlet end of the tube and outwardly through a nozzle located at the opposite end of the tube. To facilitate the operation of the dispensing tube, an actuator is employed which is pivotally mounted at one end to a head mounted to the body of the dispenser with the pivot connection located on one side of and adjacent to the dispensing tube. The actuator includes an actuating lever which extends on the opposite side of the tube. Cam means and cam follower means extend between the actuator and the dispensing tube for initially providing an increased downwardly applied force to the dispensing tube and subsequently decreasing the force during a dispensing stroke of the actuating lever.

In a preferred embodiment of the invention, the cam means comprises a flat surface closely adjacent the pivot connection of the actuating lever to the cover, and the cam follower comprises a rounded projection extending upwardly and to one side of the dispensing tube such that as the actuating lever is depressed, it rides over the rounded edge to provide a continuous point contact closely adjacent the pivot connection of the actuating lever to the cap thereby initially maximizing the downwardly operating force on the dispensing tube. In a preferred embodiment of the invention, the cam means further includes a secondly downwardly projecting curved member spaced from the flat area of the underside of the actuating lever for engaging a corresponding flat surface positioned in spaced relationship to the rounded cam on the dispensing tube for continuing the point contact as the dispensing lever is in motion and moving to its lowermost position.

The dispenser of the preferred embodiment of the invention includes a smooth walled cylindrical dispensing tube which extends through an aperture in a piston to which a ratchet spring having inwardly and outwardly projecting configurated tangs. The tangs engage the smooth outer wall of the tube and the inside of the dispenser body to provide unidirectional gripping forces to lower the piston for forcing paste upwardly through the dispensing tube.

The resultant structure provides an improved pump-type paste dispenser in which the piston moves smoothly downwardly with a minimal amount of pressure on the actuating lever but with an initial force on the dispensing tube which is increased to break away paste near the outlet which may have dried slightly and is therefore more viscous. Thus, the dispenser dispenses viscous substances such as toothpaste therefrom in a controlled fashion. The structure uses a relatively few integrally molded components and is relatively inexpensive and provides reliable operation. These and other features, objects and advantages of the present invention will become apparent upon reading the following description thereof together with reference to the accompanying drawings in which:

BRIEF DESCRIPTION OF THE DRAWINGS

FIG. 1 is a vertical cross-sectional view of a paste dispenser embodying the present invention shown in a first position;

FIG. 2 is a vertical cross-sectional view of the paste dispenser shown in FIG. 1 shown in a second operational position;

DETAILED DESCRIPTION OF THE PREFERRED EMBODIMENT

Figure 3:
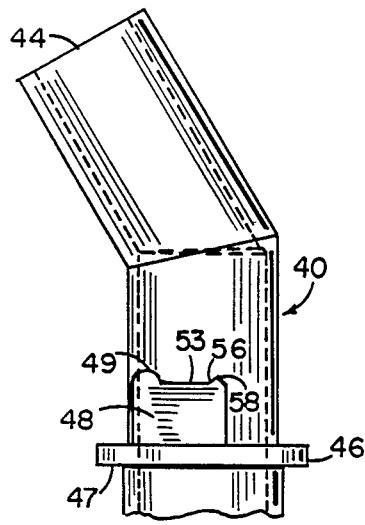
FIG. 3 is an enlarged fragmentary side elevational view of an upper portion of the dispensing tube shown also in FIGS. 1 and 2.

Referring initially to FIG. 1 there is shown a dispenser 10 which includes a generally cylindrical body 20 which is designed to sit upright as shown in FIGS. 1 and 2 and which has its upper end covered by a snap-on cap 30. Within the dispenser there is positioned a dispenser tube 40 which extends through a head 60 mounted to the upper end of body 20 to be supported concentrically for reciprocation along the vertical axis of body 20. Coupled to the head and dispensing tube is an actuator 70 which is manually operated by the user for reciprocating the dispensing tube 40 to discharge a paste such as toothpaste 120 (FIG. 1) from the outlet end 44. A piston 90 is coupled to a spring 100 for unidirectional movement with the reciprocation of tube 40 such that when the actuating surface 72 of actuator 70 is depressed downwardly as shown in FIG. 2, tube 40 moves incrementally downwardly. Spring 100 grips the outer smooth cylindrical wall of the cylindrical dispensing tube 40 pushing piston 90 downwardly and forcing toothpaste upwardly as indicated by arrow A in FIG. 2 into an inlet end 42 of dispensing tube 40 with paste in the tube being simultaneously discharged from the opposite outlet end 44. A compression return spring 110 extends between head 60 and actuator 40 to push tube 40 upwardly when pressure is released on actuator 70 which is permitted then to slide through spring 100 and attached piston 90 such that the piston remains in an incrementally downwardly moved position until the next dispensing stroke in which it is again incrementally moved to force paste upwardly through dispensing tube 40. Having briefly described the overall components and operation of the dispenser, a detailed description now follows.

The dispenser body 20 comprises an upwardly opening cylindrical member with the cylindrical side wall 22 having a smooth inner surface 23 against which an outer peripheral flange 92 (FIGS. 12-14) of piston 90 sealably slides during operation of the dispenser. The lower end of body 20 includes an integral bottom 24 and outwardly and downwardly projecting peripheral flange 26 defining a base for vertically supporting the dispenser on a flat surface. The base includes a circular recess 28. Near the top edge 25 and spaced downwardly on the inside of body 20 is an annular recess 27 for receiving a peripheral configurated annular projection 67 of the head 60. Projection 67 fits within the recess 27 to snap-lock the head to the body during assembly. Removably positioned over the top of the dispenser and flush with a flange 69 of head 60 is a cap 30 which may conveniently include a plurality of vertically extending serrations 32 for gripping for removal of the cap which is friction-fit over the upper cylindrical portion of head 60 for covering the dispenser when not in use. The cap 30 may have an upper segment which is a truncated cone as shown. Body 20 has an outer diameter of 1.71 inches and an inner diameter of 1.61 inches and an overall height of 5.27 inches in the preferred embodiment for holding approximately 4.5 ounces of paste material such as toothpaste.

Figure 4:
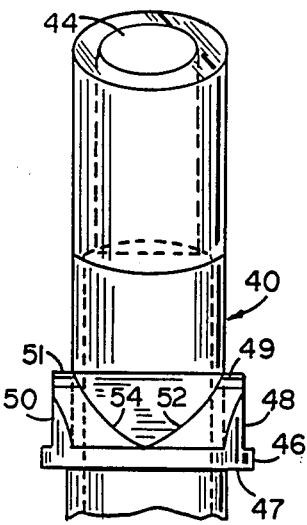
FIG. 4 is a front elevational view of the structure shown in FIG. 3.
Figure 5:
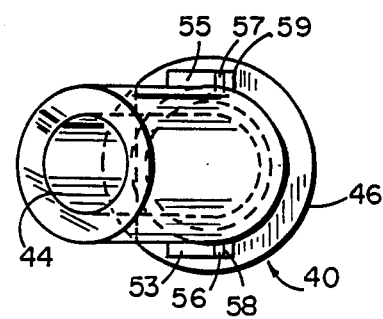
FIG. 5 is a top plan view of the structure shown in FIG. 3.
Figure 15:
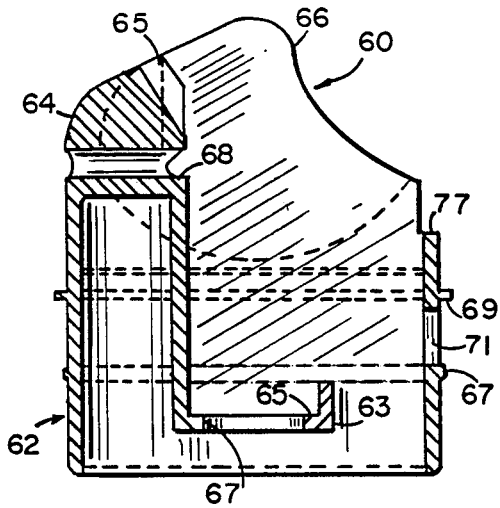
FIG. 15 is a cross-sectional view of the dispenser head shown also in FIGS. 1 and 2 and taken along section lines XV—XV of FIG. 16.

The dispensing tube 40 has an elongated straight cylindrical lower end 41 with a tapered lower edge 43 adjacent paste inlet 42. The integrally molded tube 40 includes an annular collar 46 as best seen in FIGS. 3-5 near its upper end with the lower surface 47 of collar 46 serving as a stop for the coil-type compression spring 110 as best seen in FIGS. 1 and 2. Above collar 46 there is provided camming means comprising a pair of shoulders 48 and 50 each of which include an aligned semicylindrical camming surface 49 and 51, respectively, extending along the top of the shoulders near the forward facing edge thereof. Camming surfaces 49 and 51 and collars 48 and 50 are integrally connected by arcuate fillets 52 and 54 as best seen in FIG. 4 to add strength. Behind semicircular camming surfaces 49 and 51 there are flats 53 and 55, respectively, behind which is provided a generally triangular pair of projections having leading edges 56 and 57 and trailing edges 58 and 59 for shoulders 48 and 50, respectively. As described below, these camming surfaces interact with the actuator 70 to provide an initially higher plunger force for dispensing tube 40 and a subsequent steady force for dispensing a measured amount of paste from the nozzle or outlet end 44 of the dispensing tube 40. The upper end of dispensing tube 40 is canted forwardly at an angle of approximately 30° to conveniently position the outlet 44 for the dispensing of paste therefrom onto a toothbrush or other work surface. In the preferred embodiment, tube 40 like body 20 was integrally molded of a suitable polymeric material such as polyvinylchloride (P.V.C.) and had an outer diameter of 0.426 inches and an inner diameter of 0.343 inches. The radius of curvature of camming surfaces 49 and 51 was 0.04 inches, while the length of flats 53 and 55 were 0.134 inches. The dispenser tube 40 is guidably supported for reciprocation by the head 60 now described in connection with FIGS. 15-17.

Figures 16, 17:
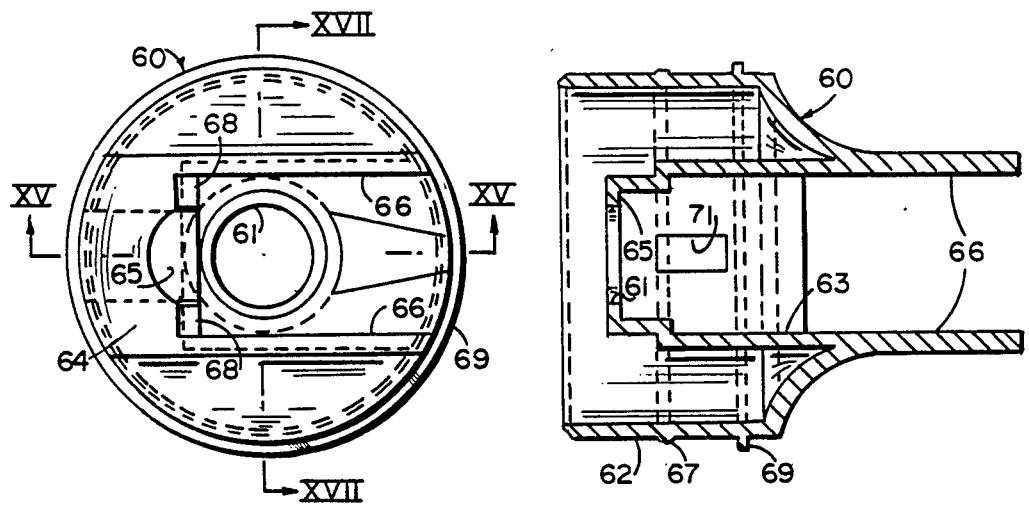
FIG. 16 is a top plan view of the dispenser head.
FIG. 17 is a cross-sectional view of the dispenser head taken along section lines XVII—XVII in FIG. 16.

The head 60 includes a generally cylindrical lower portion 62 which fits within the upper portion of the body 20 with the peripheral shoulder 67 snap-locking into the recess 27 of the body as shown in FIGS. 1 and 2. The head provides a multiplicity of functions including covering the upper portion of the cylindrical body as well as providing a pivot connection for the actuator 70 and guiding support for the vertically reciprocating dispenser tube 40. For such purpose, the head includes a centrally extending aperture 61 formed through a downwardly internally cup-shaped support structure 63 which is best seen in FIG. 17 and which includes an annular floor 65 against which the lower end of the coil compression spring 110 is seated as best seen in FIGS. 1 and 2. The upper portion of head 60 includes a pair of spaced curved arms 66 which span opposite sides of the actuator 70 to provide lateral support therefor. Resilient polymeric socket sections 68 are formed in spaced relationship across opposite sides of aperture 61 in the upstanding upwardly and forwardly extending shoulder 64 of head 60. The socket sections are generally semicylindrical for receiving the pivot rods 71 and 73 of actuator 70. A peripheral flange 69 extends around the midportion of the head to overlie the top rim 25 of body 20.

Shoulder 64 is relieved at its central area 65 to provide clearance for the nozzle end 44 of dispensing tube 40 as best seen in FIGS. 1 and 2. The cylindrical side wall of the lower end 62 of head 60 includes a rectangular aperture 77 for receiving a latch 80 on actuator arm 70 to limit the upper travel of the actuator in response to the reaction of compression spring 110 thereby restricting the motion of actuator 70 between the positions shown in FIGS. 1 and 2. The head 60 is made of a resilient polymeric material integrally molded to provide the semicylindrical laterally extending sockets 68 which are spaced slightly forwardly but above and adjacent opening 61 such that the pivot point for actuator 17 is relatively close to the dispensing tube 40 as seen in FIGS. 1 and 2. The sockets 68 circumscribe an arc of about 100° such that the pivot rod of the actuator 70 will snap-fit and be captively held within the socket sections.

Figure 6:
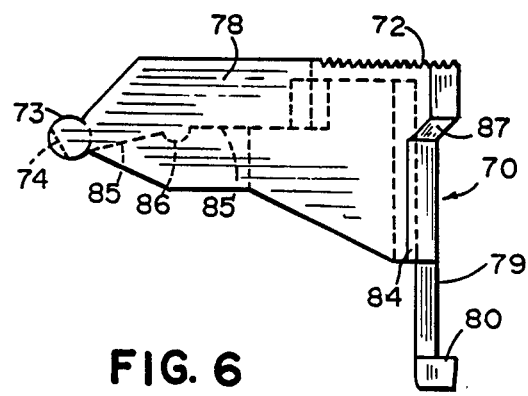
FIG. 6 is an enlarged side elevational view of the actuator shown also in FIGS. 1 and 2.
Figure 7:
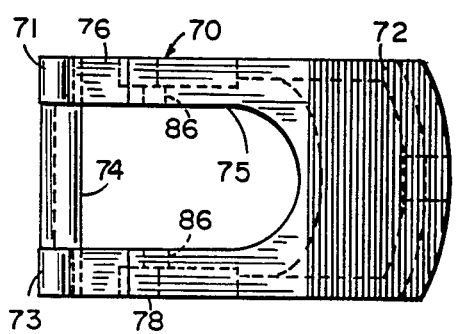
FIG. 7 is a top plan view of the actuator shown in FIG. 6.
Figure 8:
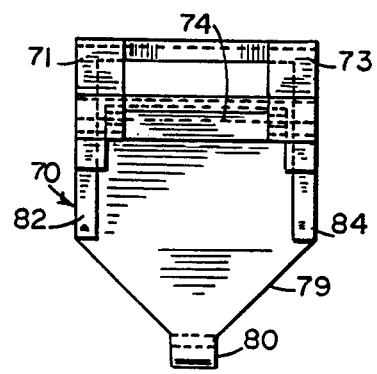
FIG. 8 is a front elevational view of the actuator shown in FIG. 6.

The actuator 70 which is pivotally attached to the head 60 and cooperates with dispensing tube 40 as seen in FIGS. 1 and 2 and FIGS. 9-11, is best shown in FIGS. 6-8 now described. The actuator includes a thumb push surface 72 knurled to provide a grip for depressing the actuator. The generally L-shaped actuator includes at its forward edge a pair of spaced pivot rod segments 71 and 73 which fit within the spaced sockets 68 of the head 60 with a recessed support bar 74 extending between the pivot segments. A generally U-shaped opening 75 extends downwardly between the legs 76 and 78 of the actuator and through which the nozzle end 44 of the dispensing tube extends. Extending downwardly from end 72 of the actuator is a downwardly projecting leg 79 having a latch 80 at its end which engages an edge of notch 77 in the head 60 as seen in FIG. 2 for limiting the upward travel of the actuator in response to the return force provided to the actuator through the camming surfaces of dispenser tube 40 by spring 110. Leg 79 as best seen in FIG. 8 is tapered and reinforced along its edges by leg segments 82 and 84. Each of the legs 76 and 78 includes a camming member comprising a flat surface 85 and a rounded member 86 projecting downwardly therefrom which aligns with and engages the camming surfaces 49, 51, 53, 55, and 56-59 of the dispensing tube 40 (FIGS. 3-5), respectively, as shown in FIGS. 1, 2 and 9-11. The interrelationship of the camming member including projection 86 of actuator and flat surface 85 of actuator 70 and the upper camming elements of the dispensing tube 40 is best seen in the sequence diagram of FIGS. 9-11 now described.

Figure 9:
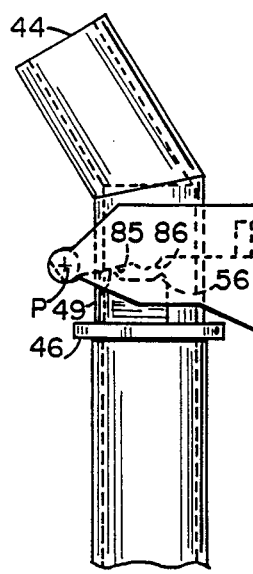
FIG. 9 is a fragmentary side elevational view illustrating the operation of the actuator and dispensing tube shown in a first position.
Figure 10:
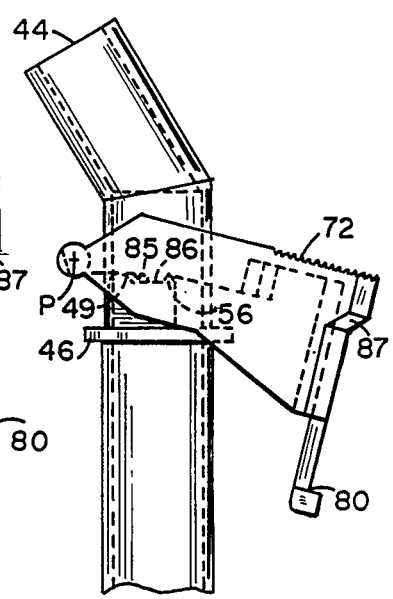
FIG. 10 is a fragmentary side elevational view showing the actuator and dispensing tube in a second intermediate position.

In FIG. 9 the actuator and dispensing tube as shown in the at-rest position as also illustrated in FIG. 1 which is the position in which spring 110 urges the latch 80 into engagement with notch 71 of the head. In this position, the lower front surface 85 of each of the legs 76 and 78 of actuator 70 engage the semicylindrical cams 49 and 51 associated with dispenser tube 40 which is the closest point of contact possible with respect to the axis P defining the pivot point for actuator 70. Thus, any force F on the actuator surface 72 is maximized as the actuator is first depressed. The downward force provided by the actuator desirably is higher at this point in time inasmuch as paste at the nozzle end 44 of the dispenser tube may have dried somewhat during a period of non-use of the dispenser and therefore be somewhat more viscous and difficult to eject. As the actuator is depressed, however, the flat surfaces 85 begin riding over cams 49 and 51 and eventually the downwardly projecting semicylindrical cam member 86 on each of the legs engages the inclined surfaces 56 and 57 of dispenser tube 40 as seen in FIG. 10. This begins transferring the force applied by the actuator 70 from the forward cam members 49 and 51 toward the rear camming surfaces 56 and 57 thereby transferring the effective fulcrum point to the right, away from pivot axis P and thus easing the force applied to the dispensing tube 40 for the same amount of downward pressure applied by the user on the pushing surface 72. As the lowermost position of the downward stroke of dispenser tube 40 is reached, as illustrated in FIG. 11, all of the force has been transferred to the rear and cam 86 has ridden forwardly onto the flat camming surface 53 while cam members 49 and 51 have disengaged from the lower surface 85 of the actuator arms 76 and 78.

Figure 11:
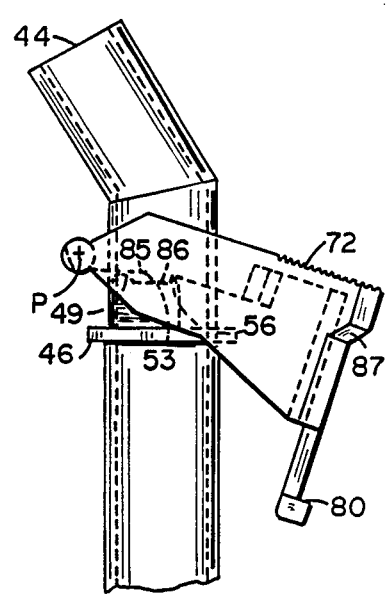
FIG. 11 is a side elevational view of the actuator and dispensing tube shown in the downwardmost position.

Thus, through the operational dispensing sequence shown in FIGS. 9-11, the effective fulcrum of the actuator pivot lever arm shifts away from the pivot point to provide a varying and decreasing force on the dispensing tube to initiate the flow of paste from the dispenser and maintain a relatively constant flow with a minimum amount of downward pressure to dispense a predetermined amount of paste. The stroke length is determined by the engagement of stop surface 87 on actuator 70 against the upper edge 77 (FIG. 15) of head 60 as illustrated in FIG. 2. This stroke typically provides a sufficient amount of paste to a toothbrush for normal brushing operations. Having described the mechanism which provides reciprocation of the dispensing tube 40, the pumping mechanism for forcing the paste upwardly through the dispensing tube 40 is described in connection with FIGS. 12-14 and 18-20 which show respectively the piston and unidirectional spring ratcheting mechanism seen also in FIGS. 1 and 2.

Figure 12:
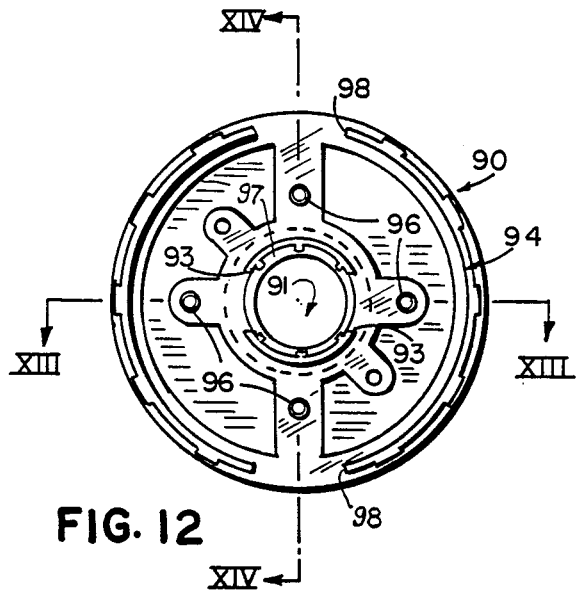
FIG. 12 is a top plan view of the piston used in connection with the dispenser and shown also in FIGS. 1 and 2.
Figure 14:
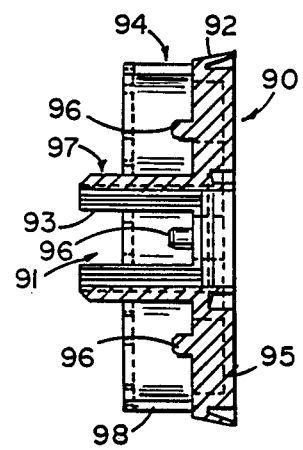
FIG. 14 is a cross-sectional view of the piston taken along section lines XIV—XIV in FIG. 12.
Figure 13:
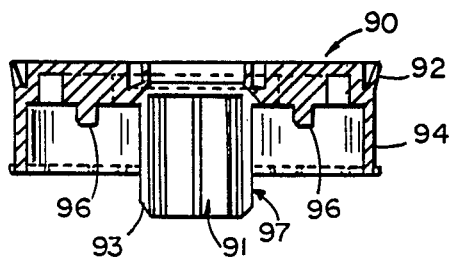
FIG. 13 is a cross-sectional view of the piston taken along section lines XIII—XIII in FIG. 12.

The piston 90 and spring 100 are coupled together with the spring located on top of the piston as seen in FIGS. 1 and 2. The piston 90 is made of a suitable resilient polymeric material such as P.V.C. and is generally disk shaped with a circular resilient peripheral sealing lip 92, which is best seen in FIGS. 13 and 14. Lip 92 has a diameter slightly greater than that of the inner diameter of the cylindrical wall 23 of body 20 such that it provides a sealed interface between the piston 90 and tube 20 as the piston moves downwardly. The body of piston 90 integrally includes a central segmented cylindrical shoulder 97 having an opening 91 which snugly surrounds the dispensing tube 40 and which has at least a pair of opposed lateral slots 93 permitting tangs 108 and 112 on spring 100 to extend therethrough and against the dispensing tube 40 as described below. Rigidity for the piston 90 is also supplied by an integral segmented annular ring 94 which extends upwardly from the body 95 of the piston. As best seen in FIGS. 12 and 14, the annular shoulder 94 includes a pair of opposed slots 98 which are spaced at 90° intervals from the slots 93 in the inner support collar 97 for permitting clearance for the spring 100 segments 104 and 105 to extend therethrough as described below. The piston includes four upwardly extending integrally formed stakes 96 spaced at 90° intervals from the upper surface of body 95 for securing the spring 100 thereto by heat staking.

Figure 18:
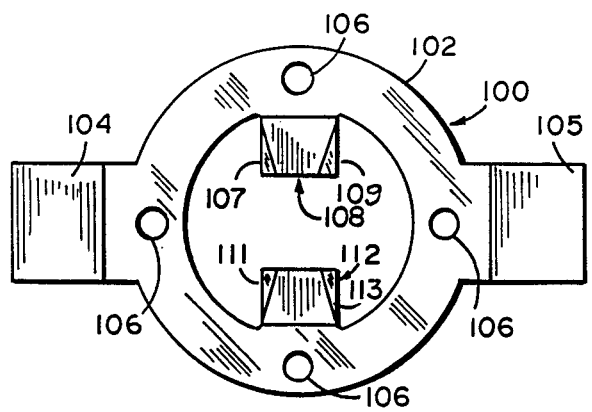
FIG. 18 is a top plan view of the dispenser spring shown also in FIGS. 1 and 2.
Figure 19:
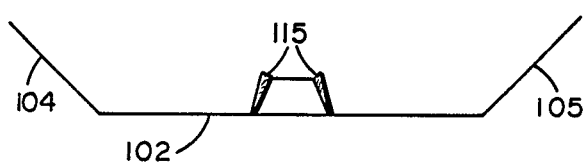
FIG. 19 is a front elevational view of the spring shown in FIG. 18.
Figure 20:
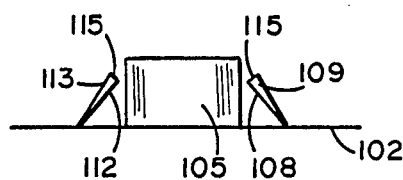
FIG. 20 is a right side elevational view of the spring shown in FIG. 18.

The spring 100 is preferably made of stainless steel and has the thickness of approximately 0.006 inches. The spring, as best seen in FIG. 18, comprises a central ring 102 with four centered and 90° spaced apertures 106 for receiving posts 96 of piston 90 which are subsequently heat staked over to the opposite surface of the spring 100 to secure the spring to the piston. Integrally extending outwardly from the ring body 102 of spring 100 are a pair of lateral tangs 104 and 105 which extend upwardly through slots 98 in the collar 94 of piston 90 to engage the side wall 23 of body 20 to resist upward movement of the piston. These tangs are upwardly bent at an angle of approximately 40° and will slide downwardly in body 20 as the dispensing tube 40 moves downwardly but will resist upward movement caused by pressure on the lower surface of piston 90 by the somewhat pressurized paste 120 within body 20. Spring 100 also includes a pair of integral inwardly extending tang 108 and 112 which likewise are bent upwardly at an angle of approximately 40° from the plane of ring 102 and which have triangular bent corners 107, 109, 111 and 113, respectively, which when bent as best seen in FIGS. 19 and 20, provide angled edges 115 to resist buckling of spring tabs 108 and 112 from the force applied by the actuator lever 72 as tube 40 moves downwardly during a dispensing stroke but which allow the tube to return upwardly by the force of spring 110 without gripping the surface.

Thus, the tangs 108 and 112 together with tangs 104 and 105 define a ratchet mechanism for piston 90 providing incremental downward motion of the piston to apply pressure to the paste 120 for dispensing a controlled amount of paste therefrom. The tapered edges 115, as seen in FIG. 19, also allow easy assembly of the piston and spring combination onto the dispenser tube 40 since the angled edges 115 will permit the piston and spring to be screwed onto the tube by acting as rudimentary screw threads. In the preferred embodiment of the invention, the outer diameter of the lip 92 of piston 90 when undeflected was 1.62 inches such that it snugly fits against the inner cylindrical wall of body 20.

The dispensing pump 10 is assembled by first positioning spring 110 over tube 40 prior to its insertion into head 60 with the spring captively held between collars 46 and 63. The dispensing tube 40 is then inserted through head 60 and the subassembly of the piston 90 and spring 100 is installed by screwing the same upwardly into the position shown in FIGS. 1 and 2. The actuator 70 is then positioned over the nozzle end 44 of the dispensing tube 40 and snap fitted into the socket 68 of head 60. The body 20 is then filled with paste 120 to a level corresponding to the lower surface of piston 90 once installed, and the head assembly now including the piston dispensing tube and actuator is inserted into the open upper end of body 20 until collar 67 snaps in annular groove 27 of the body. Cap 30 can then be added and the unit is ready for shipment with the labeling either preprinted, adhesively applied or shrink-wrapped onto body 20 prior to its assembly with the remaining pumping elements.

It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows:

1. A paste dispenser comprising:
   a generally cylindrical body for holding a supply of paste to be dispensed;
   a dispensing assembly including a dispensing tube extending into said cylindrical body and movable for dispensing paste from one end thereof, said assembly including a piston and unidirectional motion means coupling said piston and tube such that said piston moves incrementally in said body from a starting position with successive strokes of said dispensing tube;
   a head enclosing an upper end of said body, said head including aperture means through which said dispensing tube extends and integral socket means adjacent said aperture;
   actuator means for moving said dispensing tube, said actuator means having a pivot end which is pivotally received in said socket means of said head; and
   first and second spaced projection means extending between said tube and said actuator means such that as said actuator is manually actuated by a user, the physical contact between said actuator means and said tube transfers away from said pivot end as the contact transfers from said first projection means to said second projection means a variable force is applied to said tube in response to a constant force applied by the user for moving said tube for dispensing a predetermined amount of paste.

2. The apparatus as defined in claim 1 wherein said first projection means extending between said tube and said actuator comprises a cam formed on one of said actuator or said tube and further including a cam follower formed on the other of said actuator or said tube.

3. The apparatus as defined in claim 2 wherein said cam comprises a first rounded projection and said cam follower comprises a first flat surface.

4. The apparatus as defined in claim 1 wherein said unidirectional motion means comprises a spring coupled to said piston.

5. The apparatus as defined in claim 4 wherein said spring comprises a flat annular body with first outwardly projecting tang means for engaging the inner wall of said body for limiting the movement of said spring with respect to said body in a first direction and second inwardly projecting tang means engaging said dispensing tube for locking said piston to said dispensing tube when said tube moves in a direction to dispense paste and for releasing said tube when it returns in a direction opposite the dispensing direction.

6. The apparatus as defined in claim 5 wherein said second tang means comprises a pair of opposed arms deflected from the plane of said annular body.

7. The apparatus as defined in claim 6 wherein said arm includes sides which are deflected in a direction toward said annular body for providing edges which seatably engage said dispensing tube when moved in a dispensing direction.

8. The apparatus as defined in claim 7 wherein said first tang means comprises a pair of substantially flat arms deflected from said annular body in the same direction as said opposed arms of said second tang means.

9. The apparatus as defined in claim 1 wherein said socket means comprises a pair of spaced generally semi-cylindrical socket sections made of a resilient polymeric material and wherein said pivot end comprises a pair of spaced pivot rods aligned with said socket sections.

10. A paste dispenser comprising:
    a generally cylindrical body for holding a supply of paste to be dispensed;
    a dispensing assembly including a dispensing tube extending into said cylindrical body and movable for dispensing paste from one end thereof, said assembly including a piston and unidirectional motion means coupling said piston and tube such that said piston moves incrementally in said body from a starting position with successive strokes of said dispensing tube;
    a head enclosing an upper end of said body, said head including aperture means through which said dispensing tube extends and integral socket means adjacent said aperture;

actuator means for moving said dispensing tube, said actuator means having a pivot end which is pivotally received in said socket means of said head; and means extending between said tube and said actuator means such that as said actuator is manually actuated by a user, a variable force is applied to said tube for moving said tube for dispensing a predetermined amount of paste, wherein said means extending between said tube and said actuator means comprises a camming member formed on one of said actuator means or said tube and a camming surface formed on the other of said actuator means or said tube, and wherein said camming member comprises a first rounded projection and said camming surface comprises a first flat surface, and wherein said camming member further includes a second flat surface spaced from said rounded projection and said camming surface includes a second rounded projection at one end of said first flat surface.

11. The apparatus as defined in claim 10 wherein said camming surface further includes a projection at an end of said first flat surface remote from said second rounded projection for engaging said first rounded projection of said camming member.

12. The apparatus as defined in claim 11 wherein said projection is triangular.

13. The apparatus as defined in claim 12 wherein said camming member is formed on said actuator means and said camming surface is formed on said dispensing tube.

* * * * *